United States Patent
Endoh et al.

(10) Patent No.: US 8,044,144 B2
(45) Date of Patent: Oct. 25, 2011

(54) RESIN COMPOSITION, TRANSPARENT FILM OR SHEET HAVING ELASTICITY RECOVERING PROPERTY, AND WRAP FILM

(75) Inventors: Masahiko Endoh, Chiba (JP); Misao Mukui, Chiba (JP); Junichi Matsumoto, Chiba (JP)

(73) Assignee: Prime Polymer Co., Ltd., Tokyo (JP)

( * ) Notice: Subject to any disclaimer, the term of this patent is extended or adjusted under 35 U.S.C. 154(b) by 609 days.

(21) Appl. No.: 11/815,260

(22) PCT Filed: Feb. 1, 2006

(86) PCT No.: PCT/JP2006/301630
§ 371 (c)(1),
(2), (4) Date: Feb. 20, 2008

(87) PCT Pub. No.: WO2006/082830
PCT Pub. Date: Aug. 10, 2006

(65) Prior Publication Data
US 2009/0012238 A1   Jan. 8, 2009

(30) Foreign Application Priority Data
Feb. 1, 2005 (JP) .................................. 2005-025482

(51) Int. Cl.
*C08F 210/16* (2006.01)
*C08F 297/08* (2006.01)
*C08L 23/16* (2006.01)

(52) U.S. Cl. ........ 525/323; 525/240; 525/322; 525/324; 526/348

(58) Field of Classification Search ................. 525/322, 525/323, 324, 240; 526/348
See application file for complete search history.

(56) References Cited

U.S. PATENT DOCUMENTS
5,627,245 A * 5/1997 Winter et al. ................. 526/127

FOREIGN PATENT DOCUMENTS
| EP | 0 433 987 A2 | 6/1991 |
| JP | 5-209019 | 8/1993 |
| JP | 2001-323119 | * 11/2001 |
| JP | 2002-20431 | 1/2002 |
| JP | 2003-11301 | 1/2003 |

* cited by examiner

*Primary Examiner* — Roberto Rabago
(74) *Attorney, Agent, or Firm* — Oblon, Spivak, McClelland, Maier & Neustadt, L.L.P.

(57) ABSTRACT

The present invention provides a propylene-ethylene copolymer which is excellent in a balance between a heat resistance and an elasticity recovering property and has a good transparency and which is improved in peel whitening brought about by mutual adhesion in storing specific to soft materials, a resin composition for a transparent elasticity recovering film or sheet comprising the above copolymer, a transparent elasticity recovering film or sheet and a wrap film.

8 Claims, No Drawings

RESIN COMPOSITION, TRANSPARENT FILM OR SHEET HAVING ELASTICITY RECOVERING PROPERTY, AND WRAP FILM

BACKGROUND OF THE INVENTION

The present invention relates to a propylene-ethylene copolymer suited as a material for a transparent film or sheet having elasticity recovering property in which conversion to non-polyvinyl chloride proceeds, a resin composition for a transparent film or sheet having elasticity recovering property comprising the above copolymer and a transparent elasticity recovering film or sheet and a wrap film comprising the above resin composition.

RELATED ART

Polyvinyl chloride and polyvinylidene chloride base materials have so far been used for wrap films, but because of environmental problems originating from dioxin and the like which are generated in waste disposal, development of non-polyvinyl chloride resin base materials has been expedited. In particular polyolefin base materials have been developed, and styrene base elastomers, polyolefin base thermoplastic elastomers (TPO), metallocene base linear low density polyethylene (LLDPE) ethylene-vinyl alcohol copolymers (EVA) and the like are indispensable components for developing an elasticity recovering property.

One of the important characteristics of a wrap film includes an elasticity recovering property.

However, conventional wrap films comprise combinations of particularly soft materials such as styrene base elastomers, TPO and the like in order to develop the above characteristic, and they are not satisfactory in balance between an elasticity recovering property and a heat resistance. Further, a large addition amount of the above components has provided problems including inferior appearance such as blocking brought about by mutual adhesion between film faces, whitening in peeling the films and the like.

Materials obtained by combining polypropylenes having different stereoregularities (for example, patent document 1) are proposed as materials having a good balance between an elasticity recovering property and a heat resistance. However, there have been the problems that the impact characteristic at low temperature is unsatisfactory and that combination thereof with polyethylene base materials for improving the above defect has an affect on the transparency.

Patent document 1: Japanese Patent Application Laid-Open No. 82469/2004

DISCLOSURE OF THE INVENTION

The present invention has been made in light of the circumstances described above, and an object thereof is to provide a propylene-ethylene copolymer which has a good balance between an elasticity recovering property and a heat resistance and is excellent in a transparency, which is improved in inferior appearance such as peel whitening brought about by mutual adhesion and which can provide the low temperature characteristic and is well-balanced, a resin composition for a transparent elasticity recovering film or sheet comprising the above copolymer and a transparent elasticity recovering film or sheet and a wrap film comprising the above resin composition.

Intensive researches repeated by the present inventors in order to achieve the object described above have resulted in finding that a propylene ethylene copolymer satisfying specific requisites is suited to a resin composition for a transparent elasticity recovering film or sheet.

The present invention has been completed based on the above knowledge.

That is, the present invention provides;
1. a propylene-ethylene copolymer satisfying the following requisites:
   (1) triad chain ratio $f_{EEE}$ of [EEE]: $\leq 0.1$ (mole %),
   (2) product (Re·Rp) of reactivity ratios of ethylene and propylene: $\geq 0.5$,
   (3) molecular weight distribution (Mw/Mn): $\leq 3.5$,
   (4) enthalpy of melting ($\Delta H$): 10 to 60 J/g,
   (5) melting point (Tm): $\geq 105°$ C. and
   (6) ethylene content: $\leq 10$ mole %,
2. a resin composition comprising the propylene-ethylene copolymer as described in the above item 1,
3. a resin composition comprising combination of 60 to 95 mass % of the propylene-ethylene copolymer as described in the above item 1 and 5 to 40 mass % of polyethylene having a density of 0.860 to 0.920 g/cm³,
4. the resin composition as described in the above item 2 or 3, wherein it is used for a transparent elasticity recovering film or sheets
5. the resin composition as described in the above item 4, wherein the propylene-ethylene copolymer has Tm of 135° C. or higher, and it is used for a wrap film,
6, a transparent elasticity recovering film or sheet comprising the resin composition as described in the above item 4 and
7, a wrap film comprising the resin composition as described in the above item 5.

According to the present invention, obtained are a propylene-ethylene copolymer which is excellent in a balance between a heat resistance and an elasticity recovering property and has a good transparency and which is improved in peel whitening brought about by mutual adhesion in storing specific to soft materials, a resin composition for a transparent elasticity recovering film or sheet comprising the same, a transparent elasticity recovering film or sheet and a wrap film.

BEST MODE FOR CARRYING OUT THE INVENTION

The propylene-ethylene copolymer of the present invention satisfies the following requisites:
(1) triad chain ratio $f_{EEE}$ of [EEE]: $\leq 0.1$ (mole %),
(2) product (Re·Rp) of reactivity ratios of ethylene and propylene: $\geq 0.5$,
(3) molecular weight distribution (Mw/Mn): $\leq 3.5$,
(4) enthalpy of melting ($\Delta H$): 10 to 60 J/g,
(5) melting point (Tm): $\geq 105°$ C. and
(6) ethylene content: $\leq 10$ mole %.

The resin composition of the present invention comprises the propylene-ethylene copolymer or comprises combination of 60 to 95 mass % of the propylene-ethylene copolymer described above and 5 to 40 mass % of polyethylene having a density of 0.860 to 0.920 g/cm³.

In this regard, the resin composition in the latter case comprises combination of preferably 65 to 90 mass % of the propylene-ethylene copolymer and 35 to 10 mass % of polyethylene, more preferably 70 to mass % of the propylene-ethylene copolymer and 30 to 10 mass % of polyethylene.

Next, the propylene-ethylene copolymer of the present invention shall be described.

The measuring methods of the respective characteristics shall be described later.

The triad chain ratio $f_{EEE}$ is preferably 0.08 mole % or less, more preferably 0.05 mole % or less.

If it does not satisfy 0.1 mole % or less, the transparency is deteriorated.

The triad chain ratio $f_{EEE}$ grows larger by using a Mg/Ti base catalyst, and therefore the catalyst system of the present invention described later is preferably used in order to make it 0.1 mole % or less.

Re·Rp is preferably 1.0 or more, more preferably 1.1 or more.

If it does not satisfy 0.5 or more, the heat resistance is unsatisfactory in a certain case.

Re·Rp can be controlled by a proportion of a homogeneous polymerization amount to a random copolymerization amount.

Re·Rp can be 0.5 or more, for example, by setting the homogeneous polymerization amount to 5 mass % or more.

Mw/Mn is preferably 3.3 or less, more preferably 3.0 or less.

If it does not satisfy 3.5 or less, the transparency is deteriorated or the impact strength is reduced in a certain case. In particular, the wrap film is reduced in performances in a certain case.

ΔH is preferably 20 to 50 J/g, more preferably 30 to 50 J/g.

If ΔH is less than 10 J/g, the rigidity (scratching resistance) is inferior, and if it exceeds 60 J/g, the elasticity recovering property is inferior.

Tm is preferably 135° C. or higher, more preferably 140° C. or higher.

If it does not satisfy 105° C. or higher, a reduction in the heat resistance and blocking are liable to be brought about in a certain case.

Particularly in the case of a wrap film, Tm is preferably 135° C. or higher.

The ethylene content is preferably 2 to 10 mole %, more preferably 4 to 8 mole %.

If it does not satisfy 10 mole % or less, the heat resistance is unsatisfactory in a certain case.

If it is 2 mole % or more, the compatibility is enhanced when combined with polyethylene, and the film obtained is improved in a transparency.

The triad chain ratio $f_{EEE}$, Re·Rp and the ethylene content in the copolymer each described above can be determined in the following manners.

In the propylene (P)-ethylene (E) copolymer of the present invention, the following triple chain can be calculated by the following equation according to assignment of peaks in $^{13}$C-NMR proposed in [Macromolecules, 8, 687 (1975)] by A. Zambelli et al.:

$$EPE=I_8$$

$$PPE=I_9+(I_{10}/2)+I_{11}$$

$$EEE=(EEE/2)+(PEE/4)=(I_{12}/2)+(I_{13}/4)$$

$$PPP=I_{14}+(I_{10}/2)$$

$$PEE=I_{15}$$

$$PEP=I_{16}+(I_{17}+I_{18})/4$$

wherein $I_8$ is an intensity of 33.3 ppm; $I_9$ is an intensity of 31.1 ppm; $I_{10}$ is an intensity of 31.2 ppm; $I_{11}$ is an intensity of 34.1 ppm; $I_{12}$ is an intensity of 30.0 ppm; $I_{13}$ is an intensity of 30.4 ppm; $I_{14}$ is an intensity of 29.2 ppm; $I_{15}$ is an intensity of 27.3 ppm; $I_{16}$ is an intensity of 24.7 ppm; $I_{17}$ is an intensity of 34.9 ppm; and $I_{18}$ is an intensity of 34.6 ppm.

Assuming that T=EPE+PPE+EEE+PPP+PEE+PEP, the respective triad chain ratios (mole %) can be calculated according to the following equations:

$$f_{EPE}=(EPE/T)\times 100$$

$$f_{PPE}=(PPE/T)\times 100$$

$$f_{EEE}=(EEE/T)\times 100$$

$$f_{PPP}=(PPP/T)\times 100$$

$$f_{PEE}=(PEE/T)\times 100$$

$$f_{PEP}=(PEP/T)\times 100$$

The dyad chain ratios (mole %) can be calculated from the triad chain ratios described above according to the following equations:

$$f_{PP}=f_{PPP}+[f_{PPE}/2]$$

$$f_{PE}=f_{EPE}+f_{PEP}+[(f_{PPE}+f_{PEE})/2]$$

$$f_{EE}=f_{EEE}+[f_{PEE}/2]$$

Re·Rp (product of reactivity ratios of propylene and ethylene) can be calculated from the dyad chain ratios according to the following equation:

$$Re \cdot Rp=(4f_{EE}\cdot f_{PP})/(f_{EP}\cdot f_{EP})$$

Further, the ethylene content (mole %) can be calculated according to the following equation:

$$\text{ethylene content (mole \%)}=f_{EE}+(f_{PE}/2)$$

Measurement of $^{13}$C-NMR:

The sample 220 mg is put in an NMR sample tube having a diameter of 10 mm, and 3 mL of a 1,2,4-trichlorobenzene/heavy benzene (90/10 volume %) mixed solvent is added thereto.

The sample is homogeneously dissolved at 140° C. by means of an aluminum block heater, and then the $^{13}$C-NMR spectrum is measured.

The NMR measuring conditions are described below.

NMR apparatus: EX400 (400 MHz NMR apparatus) manufactured by JEOL Ltd.
Pulse duration: 7.5 μs (45 degree pulse)
Pulse repeating time: 4 seconds
Integrated frequency: 1,000 times
Measuring temperature: 130° C.

Mw/Mn described above is measured by gel permeation (GPC).

GPC measuring apparatus:
Column: TOSO GMHHR-H(S)HT
Detector: WATERS 150 C, RI detector for liquid chromatogram
Measuring Conditions
Solvent: 1,2,4-trichlorobenzene
Measuring temperature: 145° C.
Flow velocity: 1.0 milliliter/minute
Sample concentration: 2.2 mg/milliliter
Injection amount: 160 microliter
Calibration curve: Universal Calibration
Analysis program: HT-GPC (Ver, 1.0)

Tm and ΔH each described above are determined in the following manner.

A differential scanning calorimeter (DSC-7, manufactured by PerkinElmer. Inc.) is used to melt 10 mg of the sample at 230° C. for 3 minutes under nitrogen atmosphere, and then it is cooled down to 0° C. at 1° C./minute. Further, it is maintained at 0° C. for 3 minutes and then heated at 10° C./minute to thereby obtain an enthalpy of melting, and it is set as ΔH.

A peak top of a maximum peak in a melt endothermic curve obtained above is set as a melting point (Tm).

Further, the sample is held at 230° C. for 3 minutes and then cooled down to 0° C. at 10° C./minute.

A peak top of a maximum peak in a crystallization exothermic curve obtained above is set as a crystallization temperature (Tc).

A production process for the propylene-ethylene copolymer of the present invention shall not be restricted, and preferably used is a mixture of (1) a metallocene catalyst providing high crystalline polypropylene and (2) a metallocene catalyst providing low crystalline polypropylene.

The metallocene catalyst (1) providing high crystalline polypropylene includes monocross-linking metallocene catalysts.

The monocross-linking metallocene catalyst includes a transition metal compound represented by Formula (I):

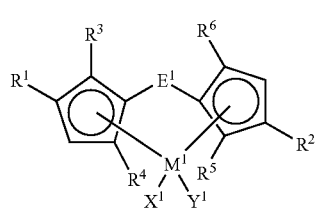

(I)

(wherein $E^1$ represents a bonding group which cross-links two conjugate five-membered ring ligands; $R^1$ and $R^2$ each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $R^3$ to $R^6$ each represent hydrogen, a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $M^1$ represents a transition metal of the fourth to sixth group in the periodic table; $X^1$ and $Y^1$ each represent a covalent binding ligand; and $X^1$ and $Y^1$ may be combined with each other to form a cyclic structure).

The hydrocarbon group represented by $R^1$ to $R^6$ has preferably 1 to 20 carbon atoms, particularly preferably 1 to 12 carbon atoms.

The above hydrocarbon group as a monovalent group may be combined with a cyclopentadienyl group which is a conjugate five-membered ring group, and when the plural groups thereof are present, two groups of $R^1$, $R^3$ and $R^4$ or two groups of $R^2$, $R^5$ and $R^6$ may be combined.

The above conjugate five-membered ring includes a substituted or non-substituted cyclopentadienyl group, an indenyl group and a fluorenyl group.

The halogen atom includes chlorine, bromine, iodine and fluorine, and the alkoxy group includes preferably alkoxy groups having 1 to 12 carbon atoms $E^1$ includes (1) an alkylene group having 1 to 4 carbon atoms, a cycloalkylene group or groups obtained by substituting side chains of the above groups with lower alkyl or phenyl, such as methylene, ethylene, isopropylene, methylphenylmethylene, diphenylmethylene, cyclohexylene and the like, (2) a silylene group, an oligosilylene group or groups obtained by substituting side chains of the above groups with lower alkyl or phenyl, such as silylene, dimethylsilylene, methylphenylene, diphenylsilylene, disilylene, tetramethyldisilylene and the like and (3) a hydrocarbon group [a lower alkyl group, a phenyl group, a hydrocarbyloxy group (preferably a lower alkoxy group) and the like] containing germanium, phosphorus, nitrogen, boron or aluminum, to be specific, $(CH_3)_2Ge$, $(C_6H_5)_2Ge$, $(CH_3)P$, $(C_6H_5)P$, $(C_4H_9)N$, $(C_6H_5)N$, $(CH_3)B$, $(C_4H_9)B$, $(C_6H_5)B$, $(C_6H_5)Al$, $(CH_3O)Al$ and the like.

Among them, the alkylene group and the silylene group are preferred.

$M^1$ represents a transition metal of the fourth to sixth group in the periodic table, and to be specific, titanium, zirconium, hafnium, niobium, molybdenum, tungsten and the like can be given. Among them, titanium, zirconium and hafnium are preferred, and zirconium is particularly suited.

$X^1$ and $Y^1$ each are a covalent binding ligand, and to be specific, they represent a hydrogen atom, a halogen atom, a hydrocarbon group having 1 to 20 carbon atoms, preferably 1 to 10 carbon atoms, an alkoxy group having 1 to 20 carbon atoms, preferably 1 to 10 carbon atoms, an amino group, a phosphorus-containing hydrocarbon group having 1 to 20 carbon atoms, preferably 1 to 12 carbon atoms (for example, diphenylphosphine and the like) or a silicon-containing hydrocarbon group having 1 to 20 carbon atoms, preferably 1 to 12 carbon atoms (for example, trimethylsilyl and the like), a hydrocarbon group having 1 to 20 carbon atoms, preferably 1 to 12 carbon atoms or halogen-containing boron compound (for example, $BF_4$ and $B(C_6H_5)_4$).

Among them, the halogen atom and the hydrocarbon group are preferred.

$X^1$ and $Y^1$ may be the same as or different from each other.

The following compounds can be given as the specific examples of the transition metal compound represented by Formula (I).

(a) Transition metal compounds having two conjugate five-membered ring ligands which are cross-linked with an alkylene group, such as methylenebis(indenyl)titanium dichloride, ethylenebis(indenyl)titanium dichloride, methylenebis(indenyl)titanium chlorohydride, ethylenebis(indenyl)methyltitanium chloride, ethylenebis(indenyl)methoxychlorotitanium, ethylenebis(indenyl)titanium diethoxide, ethylenebis(indenyl)dimethyltitanium, ethylenebis(4,5,6,7-tetrahydroindenyl)titanium dichloride, ethylenebis(2-methylindenyl)titanium dichloride, ethylenebis(2,4,7-trimethylindenyl)-titanium dichloride, ethylenebis(2-methyl-4,5-benzoindenyl)titanium dichloride, ethylenebis(2-methyl-4-phenylindenyl)titanium dichloride, ethylenebis(2-methyl-4,5,6,7-tetramethylindenyl)-titanium dichloride, ethylenebis(2-methyl-5,6-dimethylindenyl)titanium dichloride, ethylenebis(2-methyl-4-(1-naphthyl)indenyl)titanium dichloride, ethylenebis(2-methyl-4-(2-naphthyl)indenyl)titanium dichloride, ethylenebis(2-methyl-4-1-propylindenyl)-titanium dichloride, ethylenebis(2-ethyl-4-phenylindenyl)titanium dichloride, ethylenebis(2-methyl-4-toluylindenyl)titanium dichloride, ethylenebis(2,4-dimethylindenyl)titanium dichloride, ethylenebis(2-methyl-4-trimethylsilylindenyl)titanium dichloride, ethylenebis(2,4-dimethyl-5,6,7-trihydroindenyl)titanium dichloride, ethylene(2,4-dimethylcyclopentadienyl)(3',5'-dimethylcyclopentadienyl)titanium dichloride, ethylene(2-methyl-4-t-butylcyclopentadienyl)(3'-t-butyl-5'-methylcyclopentadienyl)titanium dichloride, ethylene(2,3,5-trimethylcyclopentadienyl)(2',4',5'-trimethylclopentadienyl) titanium dichloride, isopropylidenebis(2-methylindenyl) titanium dichloride, isopropylidenebis(indenyl)titanium dichloride, isopropylidenebis(2,4-dimethylindenyl)titanium dichloride, isopropylidene(2,4-dimethylcyclopentadienyl)(3',5'-dimethylcyclopentadienyl)titanium dichloride, isopropylidene(2-methyl-4-t-butylcyclopentadienyl)(3'-t-butyl-5'-methylcyclopentadienyl)titanium dichloride, ethylenebis(2-methylbenzoindenyl)titanium dichloride and ethylenebis(benzoindenyl)titanium dichloride and (b) transition metal compounds having two conjugate five-membered ring ligands which are cross-linked with a silylene group, such as dimethylsilylenebis-(indenyl)titanium dichloride, dimethylsilylenebis-(indenyl)methyltitanium chloride, dimethylsilylenebis(indenyl)methoxychlorotitanium, dimethylsilylenebis(indenyl)titanium diethoxide, dimethylsilylenebis(indenyl)dimethyltitanium, dimethylsilylenebis(4,5,6,7-tetrahydroindenyl)-titanium dichloride, dimethylsilylenebis(2-methylindenyl)titanium dichloride, dimethylsilylenebis(2,4,7-trimethylindenyl)titanium dichloride, dimethylsilylenebis(2-methyl-4,5-benzoindenyl)titanium dichloride, dimethylsilylenebis(2-methyl-4-phenylindenyl) titanium dichloride, dimethylsilylenebis(2-methyl-4,5,6,7-tetramethylindenyl)titanium dichloride, dimethylsilylenebis(2-methyl-5,6-dimethylindenyl)titanium dichloride, dimethylsilylenebis(2-methyl-4-(1-naphthyl)-indenyl)titanium dichloride, dimethylsilylenebis(2-methyl-4-(2-naphthyl)indenyl)titanium dichloride, dimethysilylenebis(2-methyl-4-1-propylindenyl)-titanium dichloride, dimethylsilylenebis (2-ethyl-4-phenylindenyl)titanium dichloride, dimethylsilylenebis(2-methyl-4-phenylindenyl) titanium dichloride, dimethylsilylenebis(2-methyl-4-toluylindenyl) titanium dichloride, dimethylsilylenebis (2,4-dimethylindenyl)titanium dichloride, dimethylsilylenebis (2-methyl-4-trimethylsilylindenyl)titanium dichloride, dimethylsilylenebis(2,4-dimethyl-5,6,7-trihydroindenyl)titanium dichloride, dimethylsilylene(2,4-dimethylcyclopentadienyl)-(3',5'-dimethylcyclopentadienyl)titanium dichloride, dimethylsilylene(2-methyl-4-t-butylcyclopentadienyl)-(3'-t-butyl-5'-methylcyclopentadienyl)titanium dichloride, dimethylsilylene(2,3,5-trimethylcyclopentadienyl)(2',4',5'-trimethylcyclopentadienyl)titanium dichloride, isopropylidenebis(2-methylindenyl)titanium dichloride, isopropylidenebis(indenyl)titanium dichloride, isopropylidenebis(2,4-dimethylindenyl)titanium dichloride, isopropylidene(2,4-dimethylclopentadienyl)(3',5'-dimethylcyclopentadienyl)titanium dichloride, isopropylidene(2-methyl-4-t-butylcyclopentadienyl)-(3'-t-butyl-5'-methylcyclopentadienyl)titanium dichloride, dimethylsilylenebis(2-methylbenzoindenyl)titanium dichloride and dimethylsilylenebis(benzoindenyl)titanium dichloride.

Further, capable of being given are compounds obtained by substituting chlorine atoms in the compounds described in above (a) and (b) with a bromine atom, an iodine atom, methyl, phenyl and the like and compounds obtained by substituting titanium which is the central metal in the transition metal compounds described above with zirconium, hafnium, niobium, tungsten and the like.

The metallocene catalyst (2) providing low crystalline polypropylene which is used in the production process for the propylene-ethylene copolymer of the present invention includes a dicross-linked metallocene catalyst.

The dicross-linked metallocene catalyst includes a transition metal compound represented by Formula (II) or Formula (III):

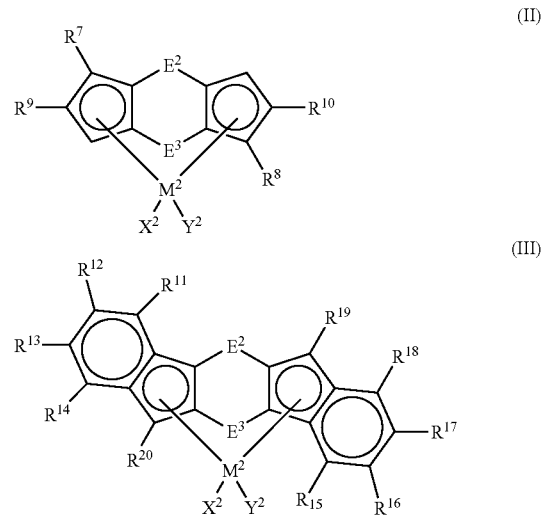

(wherein $E^2$ and $E^5$ represent a bonding group which cross-links two conjugate five-membered ring ligands; $R^9$ to $R^{18}$ each represent hydrogen, a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $R^7$, $R^8$, $R^{19}$ and $R^{20}$ each represent a hydrocarbon group, a halogen atom, an alkoxy group, a silicon-containing hydrocarbon group, a phosphorus-containing hydrocarbon group, a nitrogen-containing hydrocarbon group or a boron-containing hydrocarbon group; $M^2$ represents a transition metal of the fourth to sixth group in the periodic table; $X^2$ and $Y^2$ each represent a covalent binding ligand; and $X^2$ and $Y^2$ may be combined with each other to form a cyclic structure).

The hydrocarbon group represented by $R^7$ to $R^{20}$ has preferably 1 to 20 carbon atoms, particularly preferably 1 to 12 carbon atoms.

The above hydrocarbon group as a monovalent group may be combined with a cyclopentadienyl group which is a conjugate five-membered ring group, and when the plural groups thereof are present, $R^7$ and $R^9$ or $R^8$ and $R^{10}$ may be combined in Formula (II), and $R^{11}$ to $R^{14}$ and $R^{20}$ or two groups of $R^{15}$ to $R^{19}$ may be combined in Formula (III).

The above conjugate five-membered ring includes a substituted or non-substituted cyclopentadienyl group, an indenyl group and a fluorenyl group.

The halogen atom includes chlorine, bromine, iodine and fluorine, and the alkoxy group includes preferably alkoxy groups having 1 to 12 carbon atoms.

$E^2$ and $E^3$ include (1) an alkylene group having 1 to 4 carbon atoms, a cycloalkylene group or groups obtained by substituting side chains of the above groups with lower alkyl or phenyl, such as methylene, ethylene, isopropylene, methylphenylmethylene, diphenylmethylene, cyclohexylene and the like, (2) a silylene group, an oligosilylene group or groups obtained by substituting side chains of the above groups with lower alkyl or phenyl, such as silylene, dimethylsilylene, methylphenylene, diphenylsilylene, disilylene, tetramethyldisilylene and the like and (3) a hydrocarbon group [a lower alkyl group, a phenyl group, a hydrocarbyloxy group (preferably a lower alkoxy group) and the like] containing germanium, phosphorus, nitrogen, boron or aluminum, to be specific, $(CH_3)_2Ge$, $(C_6H_5)_2Ge$, $(CH_3)_2$, $(C_6H_5)P$, $(C_4H_9)N$, $(C_6H_5)N$, $(CH_3)B$, $(C_4H_9)B$, $(C_6H_5)B$, $(C_6H_5)Al$, $(CH_3O)Al$ and the like.

Among them, the alkylene group and the silylene group are preferred.

$E^2$ and $E^3$ may be same as or different from each other.

$M^2$ represents a transition metal of the fourth to sixth group in the periodic table, and to be specific, titanium, zirconium, hafnium, niobium, molybdenum, tungsten and the like can be given. Among them, titanium, zirconium and hafnium are preferred, and zirconium is particularly suited.

$X^2$ and $Y^2$ each are a covalent binding ligand, and to be specific, they represent a hydrogen atom, a halogen atom, a hydrocarbon group having 1 to 20 carbon atoms, preferably 1 to 10 carbon atoms, an alkoxy group having 1 to 20 carbon atoms, preferably 1 to 10 carbon atoms, an amino group, a phosphorus-containing hydrocarbon group having 1 to 20 carbon atoms, preferably 1 to 12 carbon atoms (for example, diphenylphosphine and the like) or a silicon-containing hydrocarbon group having 1 to 20 carbon atoms, preferably 1 to 12 carbon atoms (for example, trimethylsilyl and the like), a hydrocarbon group having 1 to 20 carbon atoms, preferably 1 to 12 carbon atoms or halogen-containing boron compound (for example, $BF_4$ and $B(C_6H_5)_4$).

Among them, the halogen atom and the hydrocarbon group are preferred.

$X^2$ and $Y^2$ may be the same as or different from each other.

The specific examples of the transition metal compound represented by Formula (II) include (1,2'-ethylene)(2,1'-ethylene)-bis(3-trimethylsilylcyclopentadienyl)titanium dichloride, (1,2'-dimethylsilylene)(2,1'-dimethylsilylene)-bis(3-trimethylsilylcyclopentadienyl) titanium dichloride, (1,2'-ethylene)(2,1'-ethylene)-bis(3-trimethylsilyl-4-methylcyclopentadienyl)titanium dichloride, (1,2'-dimethylsilylene)(2,1'-dimethylsilylene)-bis(3-trimethylsilyl-4-methylcyclopentadienyl)titanium dichloride and the like.

Capable of being given are compounds obtained by substituting chlorine atoms in the compounds described above with a bromine atom, an iodine atom, methyl, phenyl and the like and compounds obtained by substituting titanium which is the central metal in the transition metal compounds described above with zirconium, hafnium, niobium, tungsten and the like.

The specific examples of the transition metal compound represented by Formula (III) includes (1,2'-ethylene)(2,1'-ethylene)-bis(3-methylindenyl)titanium dichloride, (1,2'-ethylene)(2,1'-ethylene)-bis(3-methyl-4-isopropylindenyl) titanium dichloride, (1,2'-ethylene)(2,1'-ethylene)-bis(3-methyl-5,6-benzoindenyl)titanium dichloride, (1,2'-ethylene)(2,1'-isopropylidene)-bis(3-methyl-indenyl) titanium dichloride, (1,2'-methylene)(2,1'-ethylene)-bis(3-methyl-indenyl)titanium dichloride, (1,2'-methylene)(2,1'-isopropylidene)-bis(3-methyl-indenyl)titanium dichloride, (1,2'-dimethylsilylene)-(2,1'-dimethylsilylene)-bis(3-methyl-indenyl)titanium dichloride, (1,2'-dimethylsilylene)(2,1'-dimethylsilylene)-bis(3-n-butylindenyl)titanium dichloride, (1,2'-dimethylsilylene)(2,1'-dimethylsilylene)-bis(3-i-propylindenyl)titanium dichloride, (1,2'-dimethylsilylene)(2,1'-dimethylsilylene)-bis(3-trimethylsilylmethylindenyl)-titanium dichloride, (1,2'-dimethylsilylene)(2,1'-dimethylsilylene)-bis(3-phenylindenyl)titanium dichloride, (1,2'-dimethylsilylene)(2,1'-dimethylsilylene)-bis(3-methyl-4,5-benzoindenyl)titanium dichloride, (1,2'-dimethylsilylene)(2,1'-dimethylsilylene)-bis(3-methyl-4-isopropylindenyl)titanium dichloride, (1,2'-dimethylsilylene)(2,1'-dimethylsilylene)-bis(3,5,6-trimethylindenyl)titanium dichloride, (1,2'-dimethylsilylene)(2,1'-dimethylsilylene)-bis(3-methyl-4,7-di-1-propylindenyl)titanium dichloride, (1,2'-dimethylsilylene)(2,1'-dimethylsilylene)-bis(3-methyl-4-phenylindenyl)titanium dichloride, (1,2'-dimethylsilylene)(2,1'-dimethylsilylene)-bis(3-methyl-4-1-propylindenyl)titanium dichloride, (1,2'-dimethylsilylene)(2,1'-isopropylidene)-bis(3-methylindenyl)titanium dichloride, (1,2'-dimethylsilylene)(2,1'-isopropylidene)-bis(3-1-propyl-indenyl)titanium dichloride, (1,2'-dimethylsilylene) (2,1'-isopropylidene)-bis(3-n-butylindenyl)titanium dichloride, (1,2'-dimethylsilylene)(2,1'-isopropylidene)-bis(3-trimethylsilylmethylindenyl)titanium dichloride, (1,2'-dimethylsilylene)(2,1'-isopropylidene)-bis(3-trimethylsilylindenyl)titanium dichloride, (1,2'-dimethylsilylene) (2,1'-isopropylidene)-bis(3-phenylindenyl)titanium dichloride, (1,2'-dimethylsilylene)(2,1'-methylene)-bis(3-methylindenyl)titanium dichloride, (1,2'-dimethylsilylene)(2,1'-methylene)-bis(3-1-propylindenyl)titanium dichloride, (1,2'-dimethylsilylene)(2,1'-methylene)-bis(3-n-butylindenyl) titanium dichloride, (1,2'-dimethylsilylene)(2,1'-methylene)-bis(3-trimethylsilylmethylindenyl)titanium dichloride, (1,2'-dimethylsilylene)(2,1'-methylene)-bis(3-trimethylsilylindenyl)titanium dichloride, (1,2'-diphenylsilylene)(2,1'-methylene)-bis(3-methylindenyl) titanium dichloride, (1,2'-diphenylsilylene)(2,1'-methylene)-bis(3-i-propylindenyl)titanium dichloride, (1,2'-diphenylsilylene)(2,1'-methylene)-bis(3-n-butylindenyl) titanium dichloride, (1,2'-diphenylsilylene)(2,1'-methylene)-bis(3-trimethylsilylmethylindenyl)titanium dichloride, (1,2'-diphenylsilylene)(2,1'-methylene)-bis(3-trimethylsilylindenyl)titanium dichloride and the like.

Capable of being given are compounds obtained by substituting chlorine atoms in the compounds described above with a bromine atom, an iodine atom, methyl, phenyl and the like and compounds obtained by substituting titanium which is the central metal in the transition metal compounds described above with zirconium, hafnium, niobium, tungsten and the like.

A mixing ratio (mole ratio) of the metallocene catalyst providing high crystalline polypropylene to the metallocene catalyst providing low crystalline polypropylene is usually 1/1000 to 1000/1, preferably 1/1000 to 100/1 and more preferably 1/1000 to 10/1.

If it falls in the above range, the propylene-ethylene copolymer having a satisfactory softness can be obtained.

Next, any compounds can be used as a catalyst component (3-1) out of catalyst components (3) as long as they can be reacted with the transition metal compounds in the catalyst component (1) and the catalyst component (2) to form ionic complexes, and a compound represented by the following Formula (IV) or (V) can suitably be used:

　　(IV)

　　(V)

(wherein $L^2$ is $M^3$, $R^{22}R^{23}M^4$, $R^{24}{}_3C$ or $R^{25}M^5$);

[in Formulas (IV) and (V), $L^1$ represents a Lewis base; $[Z]^-$ represents non-coordinate anions $[Z^1]^-$ and $[Z^2]^-$; $[Z^1]^-$ represents an anion in which plural groups are bonded to an element, that is, $[M^3G^1G^2\ldots G^f]^-$ ($M^3$ represents a 5th to 15th group element, preferably a 13th to 15th group element in the periodic table; $G^1$ to $G^f$ each represent a hydrogen atom, a halogen atom, an alkyl group having 1 to 20 carbon atoms, a dialkylamino group having 2 to 40 carbon atoms, an alkoxy group having 1 to 20 carbon atoms, an aryl group having 6 to 20 carbon atoms, an aryloxy group having 6 to 20 carbon atoms, an alkylaryl group having 7 to 20 carbon atoms, an arylalkyl group having 7 to 20 carbon atoms, a halogen-substituted hydrocarbon group having 1 to 20 carbon atoms, an acyloxy group having 1 to 20 carbon atoms, an organic metalloid group or a hetero atom-containing hydrocarbon group having 2 to 20 carbon atoms; two or more of $G^1$ to $G^f$ may form a ring; and f represents an integer of [(valence of central metal $M^3$)+1]);

$[Z^2]^-$ represents a conjugate base of a Brønsted acid alone in which a logarithm (pKa) of an inverse number of an acid dissociation constant is −10 or less or combination of a Brønsted acid and a Lewis acid or a conjugate base of an acid which is generally defined as a superstrong acid; a Lewis acid may be coordinated therewith;

$R^{21}$ represents a hydrogen atom, an alkyl group having 1 to 20 carbon atoms, an aryl group, an alkylaryl group or an arylalkyl group, each having 6 to 20 carbon atoms; $R^{22}$ and $R^{23}$ each represent a cyclopentadienyl group, a substituted cyclopentadienyl group, an indenyl group or a fluorenyl group; 24 represents an alkyl group, an aryl group, an alkylaryl group or an arylalkyl group, each having 1 to 20 carbon atoms;

$R^{25}$ represents a large cyclic ligand such as tetraphenylporphyrin, phthalocyanine and the like; k is an ionic valency of $[L^1-R^{21}]$ and $[L^2]$ and is an integer of 1 to 3; a is an integer of 1 or more; and b=(k×a);

$M^4$ includes a 1st to 3rd group element, a 11th to 13th group element or a 17th group element in the periodic table, and $M^5$ represents a 7th to 12th group element in the periodic table].

In this regard, capable of being given as the specific examples of $L^1$ are ammonia, amines such as methylamine, aniline, dimethylamine, diethylamine, N-methylaniline, diphenylamine, N,N-dimethylaniline trimethylamine, triethylamine, tri-n-butylamine, methyldiphenylamine, pyridine, p-bromo-N,N-dimethylaniline, p-nitro-N,N-dimethylaniline and the like, phosphines such as triethylphosphine, triphenylphosphine, diphenylphosphine and the like, thioethers such as tetrahydrothiophene and the like, esters such as ethyl benzoate and the like and nitrites such as acetonitrile, benzonitrile and the like.

A hydrogen atom, methyl, ethyl, benzyl, trityl and the like can be given as the specific examples of $R^{21}$, and cyclopentadienyl, methylcyclopentadienyl, ethylcyclopentadienyl, pentaamethylcyclopentadienyl and the like can be given as the specific examples of $R^{22}$ and $R^{23}$.

Phenyl, p-tolyl, p-methoxyphenyl and the like can be given as the specific examples of $R^{24}$, and tetraphenylporphin, phthalocyanine, allyl, m-allyl and the like can be given as the specific examples of $R^{25}$.

Further, Li, Na, K, Ag, Cu, Br, I, $I^3$ and the like can be given as the specific examples of $M^4$, and Mn, Fe, Co, Ni, Zn and the like can be given as the specific examples of $M^5$.

Also, in $[Z^1]^-$, that is, $[M^3G^1G^2 \ldots G^f]$, the specific examples of $M^3$ include B, Al, Si, P, As, Sb and the like, preferably B and Al.

Further, the specific examples of $G^1$, $G^2$ ... $G^f$ include dimethylamino, diethylamino and the like as the dialkylamino group, methoxy, ethoxy, n-butoxy, phenoxy and the like as the alkoxy group or the aryloxy group, methyl, ethyl, n-propyl, isopropyl, n-butyl, isobutyl, n-octyl, n-eicosyl, phenyl, p-tolyl, benzyl, 4-t-butylphenyl, 3,5-dimethylphenyl and the like as the hydrocarbon group, fluorine, chlorine, bromine and iodine as the halogen atom, pa fluorophenyl, 3,5-difluorophenyl, pentachlorophenyl, 3,4,5-trifluorophenyl, pentafluorophenyl, 3,5-bis(trifluoromethyl)phenyl, bis(trimethylsilyl)methyl and the like as the hetero atom-containing hydrocarbon group and pentamethylantimony, trimethylsilyl, trimethylgermyl, diphenylarsine, dicyclohexylantimony, diphenylboron and the like as the organic metalloid group.

Further, the specific examples of the non-coordinate anion, that is, the conjugate base $[Z^2]^-$ of a Brønsted acid alone having a pKa of −10 or less or combination of a Brønsted acid and a Lewis acid include a trifluoromethanesulfonic acid anion $(CF_3SO^3)^-$, a bis(trifluoromethanesulfonyl)methyl anion, a bis(trifluoromethanesulfonyl)benzyl anion, bis(trifluoromethanesulfonyl)amide, a perchloric acid anion $(ClO_4)^-$, a trifluoroacetic acid anion $(CF_3CO_2)^-$, a hexafluoroantimony anion $(SbF_6)^-$, a fluorosulfonic acid anion $(FSO_3)^-$, a chlorosulfonic acid anion $(ClSO_3)^-$, fluorosulfonic acid anion/antimony pentafluoride $(FSO_3/SbF_5)^-$, fluorosulfonic acid anion/arsenic pentafluoride $(FSO_3/AsF_5)^-$, trifluoromethanesulfonic acid anion/antimony pentafluoride $(CF_3SO_3/SbF_5)^-$ and the like.

The specific examples of the ionic compound which is reacted with the transition metal compound in the catalyst component (1) and the catalyst component (2) to form an ionic complex, that is, the catalyst component compound (3-1) include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n butylammonium tetrakis(pentafluorophenyl)borate, triphenylammonium tetrakis(pentafluorophenyl)borate, tetra-n-butylammonium tetrakis(pentafluorophenyl)-borate, tetraethylammonium tetrakis-(pentafluorophenyl)borate, benzyl(tri-n-butyl)-ammonium tetrakis(pentafluorophenyl)borate, methyldiphenylammonium tetrakis(pentafluorophenyl)-borate, triphenyl(methyl)ammonium tetrakis-(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium)tetrakis-(pentafluorophenyl)borate, methyl(4-cyanopyridinium)tetrakis(pentafluorophenyl)borate, triphenylphosphonium tetrakis(pentafluorophenyl)-borate, dimethylanilinium tetrakis[bis(3,5-ditrifluoromethyl)phenyl]borate, ferrocenium tetraphenylborate, silver tetraphenylborate, trityl tetraphenylborate, tetraphenylporphyrin-manganese tetraphenylborate, ferrocenium tetrakis (pentafluorophenyl)borate, (1,1'-dimethylferrocenium) tetrakis(pentafluorophenyl)-borate, decamethylferrocenium tetrakis-(pentafluorophenyl)borate, silver tetrakis-(pentafluorophenyl)borate, trityl tetrakis-(pentafluorophenyl)borate, lithium tetrakis-(pentafluorophenyl)borate, sodium tetrakis-(pentafluorophenyl)borate, tetraphenylporphyrin manganese tetrakis(pentafluorophenyl)borate, silver tetrafluoroborate, silver hexafluorophosphate, silver hexafluoroarsenate, silver perchlorate, silver trifluoroacetate, silver trifluoromethanesulfonate and the like.

The catalyst component (3-1) may be used alone or in combination of two or more kinds thereof.

On the other hand, aluminoxane of a catalyst component (3-2) includes chain aluminoxane represented by Formula (VI):

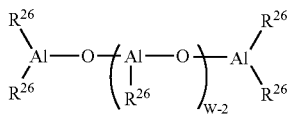
(VI)

(wherein $R^{26}$ represents a hydrocarbon group such as an alkyl group, an alkenyl group, an aryl group, an arylalkyl group, having 1 to 20 carbon atoms, preferably 1 to 12 carbon atoms, and the like or a halogen atom; w represents an average polymerization degree, and it is an integer of usually 2 to 50, preferably 2 to 40; and respective $R^{26}$ may be the same or different) and cyclic aluminoxane represented by Formula (VII):

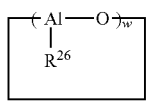
(VII)

(wherein $R^{26}$ and w are the same as in Formula (VI) described above).

A production process for the aluminoxanes described above includes a process in which alkylaluminum is brought into contact with a condensing agent such as water and the like, but means thereof shall not specifically be restricted, and the reaction can be carried out according to a publicly known process.

It includes, for example (1) a process in which an organic aluminum compound is dissolved in an organic solvent and in which the solution is brought into contact with water, (2) a process in which an organic aluminum compound is added in the beginning of polymerization and in which water is then added, (3) a process in which an organic aluminum compound is reacted with crystal water contained in metal salts and the like and water adsorbed in inorganic matters and organic matters and (4) a process in which tetraalkyldialuminoxane is reacted with trialkylaluminum and further reacted with water.

Aluminoxanes may be insoluble in toluene.

The above aluminoxanes may be used alone or in combination of two or more kinds thereof.

When the catalyst component compound (3-1) is used as the catalyst component (3), a use proportion of the total amount of the catalyst component (1) and the catalyst component (2) to the catalyst component (3) falls in a range of preferably 10:1 to 1:100, more preferably 2:1 to 1:10 in terms of a mole ratio. If the proportion falls in the range described above, the catalyst cost per a unit mass or the polymer is inexpensive and practical.

Also, when the catalyst component compound (3-2) is used, the proportion falls in a range of preferably 1:1 to 1:1000000, more preferably 1:10 to 1:10000 in terms of a mole ratio. If the proportion falls in the range described above, the catalyst cost per a unit mass of the polymer is inexpensive and practical.

As the catalyst component (3), the catalyst component (3-1) and the catalyst component (3-2) can be used alone or in combination of two or more kinds thereof.

An organic aluminum compound can be used, in addition to the catalyst component (1), the catalyst component (2) and the catalyst component (3) each described above, as a catalyst component (4) for the polymerizing catalyst in producing the propylene-ethylene copolymer.

In this connection, a compound represented by Formula (VIII) is used as the organic aluminum compound of the catalyst component (4):

(VIII)

(wherein $R^{27}$ represents an alkyl group having 1 to 10 carbon atoms; J represents a hydrogen atom, an alkoxy group having 1 to 20 carbon atoms, an aryl group having 6 to 20 carbon atoms or a halogen atom; and v is an integer of 1 to 3).

The specific examples of the compound represented by Formula (VIII) described above include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, ethylaluminum sesquichloride and the like.

The above organic aluminum compounds may be used alone or in combination of two or more kinds thereof.

In the production process for the propylene-ethylene copolymer, preliminary contact can be carried out by using the catalyst component (1)+the catalyst component (2), the catalyst component (3) and the catalyst component (4) each described above.

The preliminary contact can be carried out by bring the catalyst component (1)+the catalyst component (2) into contact with, for example, the catalyst component (3), but the method thereof shall not specifically be restricted, and a publicly known method can be used.

The above preliminary contact is effective for reducing the catalyst cost by a rise in the catalyst activity, a reduction in a use proportion of the catalyst component (3) which is a promoter and the like.

The preliminary contact temperature is usually −20 to 200° C., preferably −10 to 150° C. and more preferably 0 to 80° C.

In the preliminary contact, aliphatic hydrocarbons, aromatic hydrocarbons and the like can be used as inert hydrocarbons for the solvent.

Among them, the aliphatic hydrocarbons are particularly preferred.

A use proportion of the total amount of the catalyst component (1) and the catalyst component (2) to the catalyst component (4) each described above falls in a range of preferably 1:1 to 1:10000, more preferably 1:5 to 1:2000 and further preferably 1:10 to 1:1000 in terms of a mole ratio.

Use of the above catalyst component (4) makes it possible to enhance the polymerization activity per transition metal. However, if it is too much, the organic aluminum compound is wasted and remains in the polymer in a large amount, and therefore it is not preferred.

A porous carrier includes, to be specific, $SiO_2$, $Al_2O_3$, MgO, $ZrO_2$, $TiO_2$, $Fe_2O_3$, $B_2O_3$, CaO, ZnO, BaO, $ThO_2$ and mixtures thereof, for example, silica alumina, zeolite, ferrite, glass fiber and the like.

Among them, $SiO_2$ and $Al_2O_3$ are particularly preferred.

The porous carriers described above may contain a small amount of carbonates, nitrates, sulfates and the like.

On the other hand, magnesium compounds represented by Formula $MgR^{28}{}_xX^1{}_y$ such as $MgCl_2$, $Mg(OC_2H_5)_2$ and the like, as well as complex salts thereof, can be given as carriers other than the carriers described above.

In this regard, $R^{28}$ represents an alkyl group having 1 to 20 carbon atoms, an alkoxy group having 1 to 20 carbon atoms or an aryl group having 6 to 20 carbon atoms; $X^1$ represents a halogen atom or an alkyl group having 1 to 20 carbon atoms; x is 0 to 2; y is 0 to 2, and x+y=2.

Respective $R^{28}$ and respective $X^1$ may be the same as or different from each other.

The organic carrier includes polymers such as polystyrene, styrene-divinylbenzene copolymers, polyethylene, poly-1-butene, substituted polystyrene and polyarylate, starch, carbon and the like.

$MgCl_2$, $MgCl(OC_2H_5)$ and $Mg(OC_2H_5)_2$ are also preferred as the carrier of the catalyst used for producing the propylene-ethylene copolymer.

The properties of the carrier are varied depending on the kind and the production process thereof, and the average particle diameter is usually 1 to 300 μm, preferably 10 to 200 μm and more preferably 20 to 100 μm.

If the particle diameter is small, fine powder in the polymer is increased, and if the particle diameter is large, coarse particles in the polymer are increased to cause a reduction in the bulk density and clogging of the hopper.

A specific surface area of the carrier is usually 1 to 1000 $m^2/g$, preferably 50 to 500 $m^2/g$, and a pore volume thereof is usually 0.1 to 5 $cm^3/g$, preferably 0.3 to 3 $cm^3/g$.

If the specific surface area or the pore volume falls in the range described above, the catalyst activity is elevated.

The specific surface area and the pore volume can be determined, for examples from a volume of nitrogen gas adsorbed according to a BET method.

Further, when the carrier described above is an inorganic oxide carrier, it is used preferably after burned usually at 150 to 1000° C., preferably 200 to 800° C.

When at least one of the catalyst components is carried on the carrier described above, at least one of the catalyst component (1)+the catalyst component (2) and the catalyst component (3), preferably both of the catalyst component (1)+the catalyst component (2) and the catalyst component (3) are preferably carried thereon.

A method for carrying at least one of the catalyst component (1)+the catalyst component (2) and the catalyst component (3) on the above carrier shall not specifically be restricted, and capable of being used are, for example, (a) a method in which at least one of the catalyst component (1)+the catalyst component (2) and the catalyst component (3) is mixed with the carrier, (b) a method in which the carrier is treated with an organic aluminum compound or a halogen-containing silicon compound and then mixed with at least one of the catalyst component (1)+the catalyst component (2) and the catalyst component (3) in an inert solvent, (c) a method in which the carrier, the catalyst component (1)+the catalyst component (2) and/or the catalyst component (3) are reacted with an organic aluminum compound or a halogen-containing silicon compound, (d) a method in which the catalyst component (1)+the catalyst component (2) or the catalyst component (3) is carried on the carrier and then mixed with the catalyst component (3) or the catalyst component (1)+the catalyst component (2), (e) a method in which a catalytic reaction product of the catalyst component (1)+the catalyst component (2) with the catalyst component (3) is mixed with the carrier and (f) a method in which in a catalytic reaction of the catalyst component (1)+the catalyst component (2) with the catalyst component (3), the carrier is allowed to coexist.

In the methods of (d), (e) and (f), the organic aluminum compound of the catalyst component (4) can be added as well.

In the production of the catalyst used for producing the propylene-ethylene copolymer, an elastic wave may be applied in bringing the catalyst component (1)+the catalyst component (2), the catalyst component (3) and the catalyst component (4) each described above in to contact to prepare the catalyst.

The elastic wave includes usually a sonic wave, particularly preferably a supersonic wave.

To be specific, it includes a supersonic wave having a frequency of 1 to 1000 kHz, preferably a supersonic wave having a frequency of 10 to 500 kHz.

The catalyst thus obtained may be used after once removing the solvent by distillation and taking it out in the form of a solid matter or may be used for polymerization as it is.

In the production of the propylene-ethylene copolymer, an operation of carrying at least one of the catalyst component (1)+the catalyst component (2) and the catalyst component (3) on the carrier can be carried out in the polymerization system to thereby produce the catalyst.

Capable of being used is, for example, a method in which at least one of the catalyst component (1)+the catalyst component (2) and the catalyst component (3) and the carrier, and if necessary, the organic aluminum compound of the catalyst component (4) are added and in which olefin such as ethylene and the like is added thereto at atmospheric pressure to 2 MPa to carry out preliminary polymerization at −20 to 200° C. for one minute to 2 hours to produce catalyst particles.

A use proportion of the catalyst component (3-1) to the carrier in the catalyst used for producing the propylene-ethylene copolymer is preferably 1:5 to 1:10000, more preferably 1:10 to 1:500 in terms of a mass ratio, and a use proportion of the catalyst component (3-2) to the carrier is preferably 1:05 to 1:1000, more preferably 1:1 to 1-50 in terms of a mass ratio.

When the catalyst component (3) is used in a mixture of two or more kinds thereof, a use proportion of the respective catalyst components (3) to the carrier falls preferably in the range described above in terms of a mass ratio.

A use proportion of the catalyst component (1)+the catalyst component (2) to the carrier is preferably 1:5 to 1:10000, more preferably 1:10 to 1:500 in terms of a mass ratio.

If a use proportion of the catalyst component (3) (the catalyst component (3-1) or the catalyst component (3-2) to the carrier or a use proportion of the catalyst component (1)+the catalyst component (2) to the carrier fails in the range described above, the activity is elevated, and the powder morphology is enhanced as well.

The catalyst for polymerization thus prepared has an average particle diameter of usually 2 to 200 μm, preferably 10 to 150 μm and particularly preferably 20 to 100 μm and a specific surface area of usually 20 to 1000 $m^2/g$, preferably 50 to 500 $m^2/g$.

If the average particle diameter is 2 μm or more, fine powders contained in the polymer are reduced, and if it is 200 μm or less, coarse particles contained in the polymer are reduced.

If the specific surface area is 20 $m^2/g$ or more, the activity is elevated, and if it is 1000 $m^2/g$ or less, the polymer is increased in a bulk density.

In the catalyst used for producing the propylene-ethylene copolymer, an amount of the transition metal contained in 100 g of the carrier is usually 0.05 to 10 g, particularly preferably 0.1 to 2 g.

If an amount of the transition metal falls in the range described above, the activity is elevated.

Polymerization of propylene in the first step can be selected from slurry polymerization and bulk polymerization.

Copolymerization of propylene and ethylene in the second step can be selected prom slurry, bulk and gas phase polymerizations.

The first step and the second step can be carried out as well by multistage polymerization.

In the polymerization conditions in homopolymerization of propylene, the polymerization pressure shall not specifically be restricted and is suitably selected in a range of usually atmospheric pressure to 8 MPa, preferably 0.2 to 5 MPa, and the polymerization temperature is suitably selected in a range of usually 0 to 200° C., preferably 30 to 100° C.

The polymerization time is usually 5 minutes to 20 hours, preferably 10 minutes to 10 hours.

In the polymerization conditions of the copolymerization part, the polymerization pressure shall not specifically be restricted and is suitably selected in a range of usually atmospheric pressure to 8 MPa, preferably 0.2 to 5 MPa, and the polymerization temperature is suitably selected in a range of usually 0 to 200° C., preferably 20 to 100° C.

The polymerization time is usually one minute to 20 hours, preferably one minute to 10 hours.

A proportion of propylene to ethylene supplied is 0.01 to 9, preferably 0.05 to 2.3 in terms of a mole ratio.

The molecular weights of the polymers in the propylene homopolymerization part and the copolymerization part can be controlled by adding a chain transfer agent, preferably adding hydrogen.

Further, inert gas such as nitrogen may be allowed to be present.

When using a polymerization solvent, capable of being used are, for example, aromatic hydrocarbons such as benzene, toluene, xylene, ethylbenzene and the like, alicyclic hydrocarbons such as cyclopentane, cyclohexane, methylcyclohexane and the like, aliphatic hydrocarbons such as pentane, hexane, heptane, octane and the like and halogenated hydrocarbons such as chloroform, dichloromethane and the like.

The above solvents may be used alone or in combination of two or more kinds thereof.

Polymerization can be carried out in the absence of the solvent depending on the polymerization methods.

In the polymerization, the catalyst for polymerization described above can be used to carry out preliminary polymerization.

The preliminary polymerization can be carried out by bringing the solid catalyst component into contact with a small amount of olefin. A method therefor shall not specifically be restricted, and publicly known methods can be used.

The olefin used for the preliminary polymerization shall not specifically be restricted, and capable of being given are the same ones as shown above as the examples, for example, ethylene, α-olefins having 3 to 20 carbon atoms and mixtures thereof. Ethylene or propylene used in the above polymerization is advantageously used.

The preliminary polymerization temperature is usually −20 to 200° C., preferably −10 to 130° C. and more preferably 0 to 80° C.

In the preliminary polymerization, aliphatic hydrocarbons, aromatic hydrocarbons and the like can be used as a solvent.

Among them, the aliphatic hydrocarbons are particularly preferred.

The preliminary polymerization may be carried out in the absence of the solvent.

In the preliminary polymerization, the conditions are preferably controlled so that a limiting viscosity [η] (measured in decalin of 135° C.) of the preliminary polymerization product is 0.2 dl/g or more, particularly 0.5 dl/g or more and that an amount of the preliminary polymerization product per millimole of the transition metal component contained in the catalyst is 1 to 10000 g, particularly 10 to 1000 g.

The higher the proportion of the metallocene catalyst providing low crystalline polypropylene/the metallocene catalyst providing high crystalline polypropylene and the more the amount of ethylene used, the more the soft propylene-ethylene copolymer is obtained.

Further, use of the metallocene catalyst makes it possible to control the internal haze to less than 55%.

The polyethylene of the present invention has a density of 0.860 to 0.920 g/cm$^3$, preferably 0.865 to g/cm$^3$ and more preferably 0.870 to 0.910 g/cm$^3$.

The polyethylene of the present invention can be produced by an ordinary method and includes polyethylene obtained by copolymerizing ethylene with butene, hexene, octene or the like by a metallocene base catalyst and a Ziegler Natta catalyst.

The example of an ethylene-octene copolymer polymerized by the metallocene base catalyst includes polyethylene, trade name EG8200 (density: 0.870 g/cm$^3$) manufactured by The Dow Chemical Company.

The example of an ethylene-octene copolymer polymerized by the Ziegler Natta catalyst includes polyethylene, trade name MORETEC 1018 (density: 0.910 g/cm$^3$) manufactured by Idemitsu Petrochemical Co., Ltd. and polyethylene, trade name MORETETC V-0398CN (density: 0.908 g/cm$^3$) manufactured by Idemitsu Petrochemical Co., Ltd.

In the production of the transparent elasticity recovering film or sheet and the wrap film according to the present invention, the corresponding resin compositions can be blended, if necessary, with publicly known various additives.

The various additives used if necessary include antioxidants, neutralizing agents, slipping agents, antiblocking agents, defogging agents, lubricants, nucleators, antistatic agents and the like.

The above additives may be used alone or in combination of two or more kinds thereof.

The antioxidants include, for example, phosphorus base antioxidants, phenol base antioxidants, sulfur base antioxidants and the like.

The specific examples of the phosphorus base antioxidants include trisnonylphenyl phosphite, tris(2,4-di-t-butylphenyl) phosphite, distearyl pentaerythritol diphosphite, bis(2,4-di-t-butylphenyl)pentaerythritol phosphite, bis(2,6-di-t-butyl-4-methylphenyl)pentaerythritol phosphite, 2,2-methylenebis (4,6-di-t-butylphenyl)octyl phosphite, tetrakis(2,4-di-t-butylphenyl)-4,4-biphenylene-di-phosphonite, ADK STAB 1178 (manufactured by Asahi Denka Co., Ltd.), Sumilizer TNP (manufactured by Sumitomo Chemical Co., Ltd.), JP-135 (manufactured by Johoku Chemical Co., Ltd.), ADK STAB 2112 (manufactured by Asahi Denka Co., Ltd.), JPP-2000 (manufactured by Johoku Chemical Co., Ltd.), Weston 618 (manufactured by General Electric Company), ADK STAB PEP-24G (manufactured by Asahi Denka Co., Ltd.), ADK STAB PEP-36 (manufactured by Asahi Denka Co., Ltd.), ADK STAB HP-10 (manufactured by Asahi Denka Co., Ltd.), Sandstab P-EPQ (manufactured by Sand Co., Ltd.), Phosphite 168 (manufactured by Ciba Specialty Chemicals K. K.) and the like.

The specific examples of the phenol base antioxidants include 2,6-di-t-butyl-4-methylphenol, n-octadecyl-3-(3',5'-di-t-butyl-4'-hydroxyphenyl)propionate, tetrakis[methylene-3-(3,5-di-t-butyl-4-hydroxyphenyl)propionate]methane, tris(3,5-di-t-butyl-4-hydroxybenzyl)isocyanurate, 4,4'-butylidenebis-(3-methyl-6-t-butylphenol), triethylene glycol-bis[3-(3-t-butyl-4-hydroxy-5-methylphenyl)-propionate], 3,9-bis{2-[3-(3-t-butyl-4-hydroxy-5-methylphenyl)propionyloxy]-1,1-dimethylethyl}-2,4,8,10-tetraoxaspiro[5,5]undecane, Sumilizer BHT (manufactured by Sumitomo Chemical Co., Ltd.), Yoshinox BHT (manufactured by Yoshitomi Pharmaceutical Co., Ltd.), Antage BHT (manufactured by Kawaguchi Chemical Industry Co., Ltd.), Irganox 1076 (manufactured by Ciba Specialty Chemicals K. K.), Irganox 1010 (manufactured by Ciba Specialty Chemicals K. K.), ADK STAB AO-60 (manufactured by Asahi Denka Co., Ltd.), Sumilizer BP-101 (manufactured by Sumitomo Chemical Co., Ltd.), Tominox TT (manufactured by Yoshitomi Pharmaceutical Co., Ltd.), TTHP (manufactured by Toray Industries, Inc.), Irganox 3114 (manufactured by Ciba Specialty Chemicals K. K.), ADK STAB AO-20 (manufactured by Asahi Denka Co., Ltd.), ADK STAB AO-40 (manufactured by Asahi Denka Co., Ltd.), Sumilizer BBM-S (manufactured by Sumitomo Chemical Co., Ltd.), Yoshinox BB (manufactured by Yoshitomi Pharmaceutical Co., Ltd.), Antage W-300 (manufactured by Kawaguchi Chemical Industry Co., Ltd.), Irganox 245 (manufactured by Ciba Specialty Chemicals K. K.), ADK STAB AO-70 (manufactured by Asahi Denka Co., Ltd.), Tominox 917 (manufactured by Yoshitomi Pharmaceutical Co., Ltd.), ADK STAB AO-80 (manufactured by Asahi Denka Co., Ltd.), Sumilizer GA-80 (manufactured by Sumitomo Chemical Co., Ltd.) and the like.

The specific examples of the sulfur base antioxidants include dilauryl-3,3'-thiodipropionate, dimyristoyl-3,3'-thiodipropionate, distearyl-3,3'-thiodipropionate, pentaerythritol tetrakis(3-laurylthiopropionate), Sumilizer TPL (manufactured by Sumitomo Chemical Co., Ltd.), Yoshinox DLTP (manufactured by Yoshitomi Pharmaceutical Co., Ltd.), Antiox L (manufactured by Nihon Oil & Fat Corporation), Sumilizer TPM (manufactured by Sumitomo Chemical Co., Ltd.), Yoshinox DMTP (manufactured by Yoshitomi Pharmaceutical Co., Ltd.), Antiox M (manufactured by Nihon Oil & Fat Corporation), Sumilizer TPS (manufactured by Sumitomo Chemical Co., Ltd.), Yoshinox DSTP (manufactured by Yoshitomi Pharmaceutical Co., Ltd.), Antiox S (manufactured by Nihon Oil & Fat Corporation), ADK STAB AO-412S (manufactured by Asahi Denka Co., Ltd.), SEENOX 412S (manufactured by SHIPRO KASEI KAISHA, LTD.), Sumilizer TDP (manufactured by Sumitomo Chemical Co., Ltd.) and the like.

Among them, particularly preferred are Irganox 1010: material name: pentaerythrityl-tetrakis[3-(3,5-di-t-butyl-4-hydroxyphenyl)propionate], Irgafos 168: material name: tris(2,4-di-t-butylphenyl)phosphite, Irganox 1076: material name: octadecyl-3(3,5-di-t-butyl-4-hydroxyphenyl)propionate, Irganox 1330: material name: 1,3,5-trimethyl-2,4,6-tris(3,5-di-t-butyl-4-hydroxybenzyl)benzene, Irganox 3114; material name; tris(3,5-di-t-butyl-4-hydroxybenzyl)isocyanurate and P-EPQ: material name: tetrakis(2,4-di-t-butylphenyl)-4,4'-biphenylene-di-phosphite.

When the antioxidant is used in the present invention, 0.001 to 1 mass part of the antioxidant per 100 mass parts of the resin composition described above is suitably added.

The specific use examples of the antioxidants described above include:

| Example 1: | Irganox 1010 | 1,000 ppm |
| | PEP-Q | 1,000 ppm |
| Example 2: | Irganox 1076 | 1,200 ppm |
| | PEP-Q | 600 ppm |
| | Irgafos 168 | 800 ppm |
| Example 3: | Irganox 1010 | 400 to 1,000 ppm |
| | Irgafos 168 | 700 to 1,500 ppm |

The neutralizing agents are particularly preferably calcium stearate, zinc stearate, magnesium stearate, hydrotalcite (DHT-4A): composition formula:

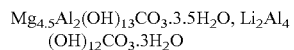

$Mg_{4.5}Al_2(OH)_{13}CO_3.3.5H_2O, Li_2Al_4(OH)_{12}CO_3.3H_2O$ ("MIZUKALAC H-1" manufactured by MIZUSAWA INDUSTRIAL CHEMICALS, LTD.) and the like.

The antiblocking agents are particularly preferably "Sylysia" manufactured by Fuji Sylysia Chemical Ltd.: synthetic silica, "MIZUKASIL" manufactured by MIZUSAWA INDUSTRIAL CHEMICALS, LTD.: synthetic silica and the like.

The slipping agents are particularly preferably erucic amide, oleic amide, stearic amide, behenic amide, ethylenebisstearic amide, ethylenebisoleic amide, stearyl erucamide and oleyl palmitoamide.

The defogging agents include glycerin fatty acid ester compounds such as (di)glycerin mono(di, tri)oleate, (di)glycerin mono(di, tri)stearate, (di)glycerin mono(di)palmitate, (di)glycerin mono(di)laurate and the like, sorbitan fatty acid ester compounds such as sorbitan laurate, sorbitan palmitate, sorbitan (tri)stearate, sorbitan (tri)oleate and the like, ethylene oxide adducts such as polyoxyethylene alkyl(phenyl) ether, polyoxyethylene sorbitan monooleate, polyoxyethylene glycerin monostearate and the like and propylene glycol fatty acid esters such as propylene glycol monolaurate, propylene glycol monopalmitate, propylene glycol monostearate, propylene glycol monooleate and the like.

The above defogging agents can be used in a plural number.

Use of the defogging agents makes it possible to prevent fogging brought about by steam generated from the wrapped article and enhance the value of the displayed articles by maintaining visibility.

When using the nucleator, an addition amount of the nucleator falls in a range of usually 10 ppm or more, preferably 10 to 10,000 ppm, more preferably 10 to 5,000 ppm and further preferably 10 to 2,500 ppm based on the resin composition for the transparent elasticity recovering film or sheet.

The resin composition of the present invention can be produced by a method in which a propylene ethylene copolymer satisfying the following requisites:
(1) triad chain ratio $f_{EEE}$ of [EEE]: $\leq 0.1$ (mole %),
(2) product (Re·Rp) of reactivity ratios of propylene and ethylene: $\geq 0.5$,
(3) molecular weight distribution (Mw/Mn): $\leq 3.5$,
(4) enthalpy of melting ($\Delta H$): 10 to 60 J/g,
(5) melting point (Tm); $\geq 105°$ C. and
(6) ethylene content: $\leq 10$ mole % or a combination of 60 to 95 mass % of the propylene-ethylene copolymer described above and 5 to 40 mass % of polyethylene is blended with, if necessary, a prescribed amount of various additives and pelletized by an ordinary method, for example, a melt mixing equipment such as an extrusion molding machine, a Banbury mixer and the like.

A T die cast molding method, an inflation molding method, a calendar molding method and the like can be employed as a method in which the transparent elasticity recovering film or sheet and the wrap film according to the present invention are prepared by using the composition pellets obtained above.

In a molding method for the sheet and the film, the resin is heated at a molding resin temperature of 190 to 270° C., extruded and cooled to thereby produce a film.

Either of air cooling and water cooling can be employed as the cooling method.

The transparent elasticity recovering film or sheet and the wrap film according to the present invention sufficiently have the functions of a film and a sheet even if they are not drawn.

However, they can be biaxially stretched, if necessary, by a publicly known method, and this stretching makes it possible to improve a cutting property of the film and the sheet.

The transparent elasticity recovering film or sheet of the present invention has a thickness of usually 5 to 500 μm, preferably 10 to 300 μm and more preferably 60 to 120 μm.

The wrap film of the present invention has a thickness falling in a range of usually 5 to 40 μm, preferably 10 to 20 μm, and it is determined considering the applications and the use form of the wrap film.

The transparent elasticity recovering film or sheet and the wrap film according to the present invention are based on a single layer film comprising the corresponding resin composition described above, and they can be based as well on a multilayer film or sheet having at least one layer comprising the above resin composition.

Further, they can be based as well on a multilayer film or sheet comprising a resin composition layer forming the film or sheet according to the present invention and at least one layer comprising a resin suitably selected from other olefin base resins.

In this case, a proportion of the layer comprising the resin composition of the present invention falls in a range of usually 1 to 99%, preferably 20 to 80%, and the above layer is preferably at least one of the outer layers since the characteristics of the present invention can efficiently be displayed.

The other olefin base resins in the multilayer film include polypropylene, propylene-α-olefin copolymers, propylene-ethylene-diene copolymers, low density polyethylene prepared by a high pressure method, high density polyethylene, ethylene-α-olefin copolymers having a density of 0.850 to 0.940 g/cm$^3$, ethylene-vinyl acetate copolymers, hydrogenated styrene base elastomers and the like.

EXAMPLES

Next, the present invention shall be explained in further details with reference to examples, but the present invention shall by no means be restricted by these examples.

Production Example 1

Polymer 1

Preparation of Catalyst:
A catalyst prepared by carrying dimethylsilylenebis(2-methyl-benzo[e]indenyl)-zirconium (IV) dichloride (complex A) and (1,2'-dimethylsilylene)(2,1'-dimethylsilylene)bis(3-trimethylsilylmethylindenyl)zirconium (IV) dichloride (complex B) on silica-carried methylmethylaluminoxane (carried MAO, Al carrying amount: 14 mass %) so that a proportion of Zr contained in the complex A based on Al contained in carried MAO was 0.001 in terms of a mole ratio and that a proportion of Zr contained in the complex B was 0.001 in term of a molar ratio based on Al contained in carried MAO was used to carry out preliminary polymerization at 30° C. and a propylene pressure of 0.13 MPa for one hour Polymer 1: Production of Propylene Block Copolymer An autoclave of 350 L was charged with 100 L of liquid propylene, and 100 millimole of triisobutylaluminum was added thereto. Then, 200 micromole of the catalyst described above in terms of zirconium was added thereto at 35° C. to initiate polymerization.

After 30 minutes passed since initiating the polymerization, ethylene was added thereto at a partial pressure of 0.3 MPa, and the temperature was elevated up to 45° C.

Ethylene was continuously supplied so that a partial pressure was maintained at a fixed level to carry out the polymerization for 60 minutes.

After finishing the polymerization, propylene was flashed, and then the residue was dried at 80° C. for 2 hours under nitrogen flow.

The polymer thus obtained had an ethylene content of 6.9 mole % and a limiting viscosity [η] of 4.7 dl/g.

Added to the above polymer were 500 ppm of Irganox 1010 (manufactured by Ciba Specialty Chemicals K. K.) and 1000 ppm of Irgafos 168 (manufactured by Ciba Specialty Chemicals K. K.) as antioxidant agents, 300 ppm of calcium stearate as a neutralizing agent and 300 ppm of Px 14 (manufactured by Kayaku Akuzo Corporation) as peroxide, and obtained was a polymer 1 in which a melt flow rate (MFR: 230° C., load: 21.18 N) was controlled to 4 to 5 g/10 minutes in melting and kneading by an extruding machine.

The physical properties of the polymer 1 thus obtained are shown in Table 1.

Measurement of Tensile Elastic Modulus
The sample was subjected to press molding to prepare a test piece, and a tensile elastic modulus thereof was measured according to JIS K-7113.
Test piece (No. 2 dumbbell) thickness: 1 mm
Crosshead speed: 50 mm/minute
Load cell; 100 kg Production Example 2

Polymer 2

A polymer 2 was obtained in the same manner as in the polymer 1, except that changed were the initial polymerization temperature to 40° C., the ethylene partial pressure to 0.15 MPa and the copolymerization temperature to 50° C.

The physical properties of the polymer 2 thus obtained were measured in the same manner as in Production Example 1. The results thereof are shown in Table 1.

Production Example 3

Polymer 3

A polymer 3 was obtained in the same manner as in the polymer 2, except that the complex A/the complex B was changed to 4/3 (mole ratio).

The physical properties of the polymer 3 thus obtained were measured in the same manner as in Production Example 1. The results thereof are shown in Table 1.

Production Example 4

Polymer 4

A polymer 4 was obtained in the same manner as in the polymer 2, except that the ethylene partial pressure was changed to 0.2 MPa.

The physical properties of the polymer 4 thus obtained were measured in the same manner as in Production Example 1. The results thereof are shown in Table 1.

TABLE 1

|  | Production Example | | | | |
|---|---|---|---|---|---|
|  | 1 Polymer 1 | 2 Polymer 2 | 3 Polymer 3 | 4 Polymer 4 | LLDPE (V-0398CN) |
| $f_{EEE}$ (mole %) | 0 | 0 | 0 | 0 |  |
| Re · Rp | 1.2 | 1.3 | 1.4 | 1.3 |  |
| Mw/Mn | 3.1 | 2.7 | 2.8 | 2.6 |  |
| ΔH (J/g) | 11 | 22 | 52 | 18 | 30 |
| Tm (°C) | 110 | 136 | 140 | 135 | 121 |
| Ethylene content (mass %) | 6.9 | 4.0 | 2.7 | 4.4 |  |
| MRF (g/10 min) | 4.5 | 4.6 | 4.9 | 4.7 | 3.2 |
| Tensile elastic modulus (MPa) | 23 | 104 | 202 | 44 | 9 |

Example 1

The polymer 1 was extrusion-molded at a dice outlet resin temperature of 240° C. by means of a cast molding machine of 40 mmϕ to obtain a film of 35 μm.

The film thus obtained was used to measure the following properties. The results thereof are shown in Table 2.

The film obtained was left standing at 23±2° C. and a humidity of 50±10% for 16 hours and then used for evaluating the following items at the same temperature and humidity.

Measurement of Digital Compression Restoring Property:

A dice having a side of 45 mm was put in the central part of a stainless-made tray (inner dimension 125×180×depth 70 mm), and the mouth of the tray was wrapped with the film cut to 160×220 mm.

Then, the central part of the film was slowly pushed with a finger, and when the finger reached the dice put on the bottom, the finger was separated from the film to observe the state of the film after 3 minutes.

⊚: restored to the original state
○: almost restored
Δ: restored a little poorly
X: restored poorly
XX: not restored Measurement of Elasticity Recovering Rate:

A JIS No. 2 dumbbell of 1 mmt was used.

The sample was marked with a reference line ($L_0$) of about 4 cm and stretched by 100% at a drawing speed of 50 mm/minute by means of a tensile tester (a length of the reference line was set to $L_{100}$), and it was restored soon to the original state (state of stretching by 0%).

After one minute passed, a length $L_1$ of the reference line was measured to calculate the elastic recovering rate according to the following equation:

$$[1-(L_{100}-L_1)/L_0]\times 100 (\%)$$

Measurement of Internal Haze:
Measured according to JIS K7105.

Measurement of Izod Impact Strength:
Measured according to JIS K7110.

Measurement of Change with the Passage of Time (Peeling Whitening Resistance):

The film obtained was cut to a size of 210 mm×297 mm, and 30 sheets of the film were superposed and stored in an oven of 30° C. for 30 days. Then, they were taken out, and the films were peeled off sheet by sheet to observe the appearance thereof.

○: whitening and a change in the appearance are scarcely observed
Δ: whitened parts are unevenly dotted
X; film is notably whitened and stretched in peeling Example 2

Pellets were obtained in the same manner as in Example 1 except that the polymer 2 was used, and then a film of 35 μm was obtained to measure physical properties.

The results thereof are shown in Table 2.

Example 3

Pellets were obtained in the same manner as in Example 1, except that the polymer 3 was used, and then a film of 35 μm was obtained to measure physical properties.

The results thereof are shown in Table 2.

Example 4

Pellets were obtained in the same manner as in Example 1, except that used was the polymer 4 blended with linear low density polyethylene (LLDPE) (Moretec V-0398CN (density: 0.907 g/cm³), manufactured by Idemitsu Petrochemical Co., Ltd.) in a mass ratio of 90/10, and then a film of 35 μm was obtained.

The physical properties of the film thus obtained were measured. The results thereof are shown in Table 2.

Example 5

Pellets were obtained in the same manner as in Example 1, except that used was the polymer 4 blended with linear low density polyethylene (LLDPE) (Moretec V-0398CN (density: 0.907 g/cm³), manufactured by Idemitsu Petrochemical Co., Ltd.) in a mass ratio of 65/35, and then a film of 35 μm was obtained.

The physical properties of the film thus obtained were measured. The results thereof are shown in Table 2.

Example 6

Pellets were obtained in the same manner as in Example 1, except that used was the polymer 4 blended with linear low density polyethylene (LLDPE) (Engage EG8200 (density; 0.870 g/cm³), manufactured by The Dow Chemical Company) in a mass ratio of 80/20, and then a film of 3 μm was obtained.

The physical properties of the film thus obtained were measured. The results thereof are shown in Table 2.

Comparative Example 1

Pellets were obtained in the same manner as in Example 1, except that used was random polypropylene (random PP) (Polypropylene F-730NV manufactured by Idemitsu Kosan Co., Ltd., ethylene content; 2 mole %, melt flow rate (MFR): 7 g/10 minutes, tensile elastic modulus: 800 MPa) blended with a styrene base elastomer (Dynaron 1320P, manufactured by JSR Corporation) in a mass ratio of 60/40, and then a film of 35 μm was obtained.

The physical properties of the film thus obtained were measured. The results thereof are shown in Table 2.

Comparative Example 2

Pellets were obtained in the same manner as in Example 1, except that used was a polyolefin base thermoplastic elastomer (TPO) (T310E, propylene ethylene copolymer, manufactured by Idemitsu Kosan Co., Ltd., ethylene content: 28 mole %), and then a film of 35 μm was obtained.

The physical properties of the film thus obtained were measured. The results thereof are shown in Table 2.

Comparative Example 3

Pellets were obtained in the same manner as in Example 1, except that used was random polypropylene (random PP) (Polypropylene F-730NV manufactured by Idemitsu Kosan Co. Ltd., ethylene content: 2 mole %, melt flow rate (MFR) 7 g/10 minutes, tensile elastic modulus: 800 MPa) blended with the polyolefin base thermoplastic elastomer (TPO) (T310E, propylene-ethylene copolymer, manufactured by Idemitsu Kosan Co., Ltd., ethylene content; 28 mole %) in a mass ratio of 40/60, and then a film of 35 μm was obtained.

The physical properties of the film thus obtained were measured. The results thereof are shown in Table 2.

Comparative Example 4

Pellets were obtained in the same manner as in Example 1, except that used was random polypropylene (random PP) (Polypropylene F-730NV manufactured by Idemitsu Kosan Co., Ltd., ethylene content: 2 mole %, melt flow rate (MFR): 7 g/10 minutes, tensile elastic modulus: 800 MPa) blended with low stereospecific polypropylene (produced according to a synthetic method for a propylene polymer [1] described in Japanese Patent Application Laid-Open No, 47383/2002; ΔH: 25 J/g, mesopentad ratio (mmmm): 0.45, melt flow rate (MFR) 6 g/10 minutes) in a mass ratio of 50/50, and then a film of 35 μm was obtained.

The physical properties of the film thus obtained were measured. The results thereof are shown in Table 2.

Comparative Example 5

Pellets were obtained in the same manner as in Example 1, except that used was linear low density polyethylene (LL-DPE) (Engage EG8200 (density: 0.870 g/cm$^3$), manufactured by The Dow Chemical Company), and then a film of 35 μm was obtained.

The physical properties of the film thus obtained were measured. The results thereof are shown in Table 2.

TABLE 2

| | Example | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Polymer | 1 | 2 | 3 | 4 | 4 | 4 | | | | | |
| Addition amount (%) | 100 | 100 | 100 | 90/10 | 65/35 | 80/20 | | | | | |
| ΔH (J/g) | 15 | 25 | 52 | 40 | 50 | 25 | 50 | 30 | 60 | 40 | 60 |
| Tm (° C.) | 118 | 138 | 142 | 137 | 137 | 137 | 153 | 153 | 153 | 145 | 90 |
| Digital compression restoring property (%) | ◎ | ◎ | ○ | ◎ | ○ | ○ | Δ | Δ | ○ | ○ | Δ |
| Elasticity recovering rate (%) | 90 | 85 | 80 | 80 | 70 | 80 | 60 | 50 | 40 | 50 | 60 |
| Internal haze (%) | 0.4 | 0.5 | 0.6 | 0.5 | 1.2 | 0.9 | 0.8 | 5.5 | 6.0 | 0.5 | 1.5 |
| Izod impact strength | N.B | 35 | 35 | N.B | N.B | N.B | N.B | N.B | N.B | 1.2 | N.B |
| change with passage of time | ○ | ○ | ○ | ○ | ○ | ○ | X | X | X | ○ | X |

INDUSTRIAL APPLICABILITY

The transparent elasticity recovering film and the sheet according to the present invention are excellent in a balance between a heat resistance and an elasticity recovering property, have a good transparency and are improved in peel whitening brought about by mutual adhesion in storing which is specific to soft materials, and harmful substances are not discharged in disposing and incinerating, so that they are safe for the global environment.

Accordingly, the transparent elasticity recovering film or sheet according to the present invention can be used for various applications such as food packaging materials, industrial packaging materials, glass films, surface protective films and the like as they are or in the form of multilayer materials combined with other films and the like.

In particular, the wrap film can suitably be used for packaging foods in resin-foamed trays, refrigerating, freezing and storing them as wrap films for business use and household use.

The invention claimed is:
1. A propylene-ethylene block copolymer having a propylene homopolymer block and a copolymer block, and satisfying the following requisites:
  (1) triad chain ratio $f_{EEE}$ of [EEE]: $\leqq 0.1$ (mole %),
  (2) product (Re·Rp) of reactivity ratios of ethylene and propylene: $\geqq 0.5$,
  (3) molecular weight distribution (Mw/Mn): $\leqq 3.5$,
  (4) enthalpy of melting (ΔH): 10 to 60 J/g,

(5) melting point (Tm): $\geqq 105°$ C. and (6) ethylene content: $\leqq 10$ mole wherein the propylene homopolymer block is provided by polymerization of propylene in a first step and the copolymer block is provided by copolymerization of propylene and ethylene in a second step.

2. A resin composition comprising the propylene-ethylene block copolymer as described in claim 1.

3. A resin composition comprising combination of 60 to 95 mass % of the propylene-ethylene block copolymer as described in claim 1 and 5 to 40 mass % of polyethylene having a density of 0.860 to 0.920 g/cm³.

4. The resin composition as described in claim 2 or 3, wherein the propylene-ethylene block copolymer has Tm of 135° C. or higher.

5. A transparent elasticity recovering film or sheet comprising the resin composition as described in claim 4.

6. A wrap film comprising the resin composition as described in claim 4.

7. The propylene-ethylene block copolymer as described in claim 1, wherein the Tm is 135° C. or higher.

8. The propylene-ethylene block copolymer as described in claim 1, wherein the MFR is 4 to 5 g/10 minutes.

* * * * *